(12) United States Patent
Schultz

(10) Patent No.: US 9,010,099 B2
(45) Date of Patent: Apr. 21, 2015

(54) EXHAUST SYSTEM FOR TWO-STROKE INTERNAL COMBUSTION ENGINE

(71) Applicant: Stephen B. Schultz, Denver, IA (US)

(72) Inventor: Stephen B. Schultz, Denver, IA (US)

( * ) Notice: Subject to any disclaimer, the term of this patent is extended or adjusted under 35 U.S.C. 154(b) by 108 days.

(21) Appl. No.: 13/681,616

(22) Filed: Nov. 20, 2012

(65) Prior Publication Data

US 2013/0125535 A1 May 23, 2013

Related U.S. Application Data

(60) Provisional application No. 61/562,792, filed on Nov. 22, 2011.

(51) Int. Cl.
| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 13/08* | (2010.01) |
| *F02B 27/04* | (2006.01) |

(52) U.S. Cl.
CPC ...... *F01N 3/00* (2013.01); *F01N 13/08* (2013.01); *F02B 27/04* (2013.01); *F01N 2470/20* (2013.01); *F01N 2470/24* (2013.01)

(58) Field of Classification Search
USPC ................... 60/312, 313, 323, 324
See application file for complete search history.

(56) References Cited

U.S. PATENT DOCUMENTS

| | | | |
|---|---|---|---|
| 3,563,030 A * | 2/1971 | Lentz | 60/288 |
| 3,710,891 A * | 1/1973 | Flugger | 181/256 |
| 3,786,791 A | 1/1974 | Richardson | |
| 4,348,862 A | 9/1982 | Fujikawa et al. | |
| 4,580,657 A | 4/1986 | Schmeichel et al. | |
| 5,378,180 A | 1/1995 | Nakayama et al. | |
| 5,925,857 A | 7/1999 | Birkel et al. | |
| 6,134,885 A | 10/2000 | Gilbertson | |
| 6,381,956 B1 | 5/2002 | Gilbertson | |
| 6,732,508 B2 | 5/2004 | Flach et al. | |
| 6,742,332 B2 | 6/2004 | Piekarski | |
| 8,127,540 B2 | 3/2012 | Harada | |

* cited by examiner

*Primary Examiner* — Audrey K Bradley
*Assistant Examiner* — Dapinder Singh
(74) *Attorney, Agent, or Firm* — James C. Nemmers; Shuttleworth & Ingersoll, PLC

(57) ABSTRACT

An exhaust pipe for two-stroke, internal-combustion engines in which there are multiple exhaust expansion chambers, each within one another, used in combination, the multiple chambers allow for the combustible fuel/air mixture to be delivered in more optimal reflective pressure waves throughout the RPM range of the engine. By changing the number of the chambers, their size and shape, the design of the exhaust pipe can be tuned for torque and power while requiring a minimum of space.

7 Claims, 3 Drawing Sheets

EXHAUST SYSTEM FOR TWO-STROKE INTERNAL COMBUSTION ENGINE

This application claims priority to U.S. Provisional Application 61/562,792 filed Nov. 22, 2011, the entirety of which is incorporated by reference herein.

BACKGROUND OF THE INVENTION

It is inherently a problem of the two-stroke internal-combustion engine that it is inefficient and has inconsistent torque and power delivery. It can be said that most if not all exhaust pipes for two-stroke engines produce a narrow power band width and are RPM related. Because of these problems, use of the relatively simple two-stroke engine has fallen from the favor of many vehicle manufacturers.

The commonly used continuous-diameter exhaust pipe merely allows for the convenient exit of exhaust from a two-cycle engine. It is well known and accepted by those skilled in the art that the two stroke engine performance can be greatly improved with the assistance of a tuned exhaust system. If properly designed and constructed, a two-stroke exhaust pipe can improve the volumetric efficiency of an engine by scavenging the initial outward-bound gas flow (by use of a diffusing shape to assist in the evacuation of the flow), and after a transitional flow, by temporarily plugging this outward exhaust gas flow (by use of a returning pressure wave created by the shape of a reflector cone) as it attempts to exit the pipe. Depending on the potential of a given two-stroke engine, the improvement can be as great as 15 to 20%.

Additional improvements to exhaust systems have led to the development of the expansion chamber as part of the exhaust system. Most important to the super charging of the engine with an expansion chamber is the amount of improvement and the resulting power band width. It is well known and accepted that the geometric shape of the expansion chamber is very important in achieving optimum performance. Typically, the expansion chamber is shaped to look like a trumpet through the first stage, followed by a single parallel can-shape for a dwell period in the second or transition stage, and finally a reverse cone (funnel-shape) at the output end. The expansion chamber may contain single or multiple expansion cones, transition areas, and reflector cones, which improve torque and power and efficiency. However, current designs that have achieved improved high levels of torque and power and/or efficiency result in bulky exhaust systems consisting of multiple, individual, stand-alone and ultimately-joined pipes with expansion chambers of differing dimensions, serving one piston, cylinder and one combustion chamber. They have achieved these levels by use of primary, secondary, and in some cases, tertiary expansion chambers not contained within one another. Some such systems have commonly-joined partitioned walls or commonly-joined but partially open walls, but again, they are not contained one within the other. See for example, Gilbertson U.S. Pat. Nos. 6,134,885 and 6,381,956. Ultimately, such systems must join their multiple expansion chambers to a single, central location, serving as an entry for the exhaust gases leaving an engine's cylinder. While these systems achieve attainable levels of torque, power and efficiency for a high performance exhaust system, the resulting structures do not meet the available space requirements of vehicle manufacturers. Thus, it has proven difficult for a designer to achieve the maximum potentials of torque and power and efficiency throughout the entire RPM range of said engines while employing the torque and power-enhancing concept of an expansion chamber within the confines of a compact unit. Moreover, in order to satisfy these design requirements, the cross sectional area at each point along the exhaust pipe needs be maintained, and the inside of the exhaust pipe needs to be free from obstructions.

There have been other attempts to achieve the goal of maximum potential or torque, power and efficiency in a compact unit by adding a single reflective cone inside the exhaust pipe, which cone extends from the outlet end and terminates just at the center or transition section. An example of such a structure is shown in Richardson U.S. Pat. No. 3,786,791. Although this structure improves somewhat the torque and efficiency without requiring additional space, it does not achieve the maximum potential possible with the use of expansion chambers in an exhaust system.

There is, therefore, a need for an improved exhaust system for two-stroke internal combustions engines that will achieve more efficient and consistent torque and power delivery throughout the RPM range of the engine while satisfying the limited space requirements desired by most vehicle manufacturers.

SUMMARY OF THE INVENTION

The invention provides for constructing multiple exhaust expansion chambers of differing quantities and dimensions, each within one another, and which, when used in combination, allows for the combustible fuel/air mixture to be delivered in more optimal reflective pressure waves throughout the RPM range of the engine. The design of such exhaust pipes can be tuned for torque and power delivery according to the torque and power delivery goals of the engine's designer, while providing this advantage in a modest space. The system of utilizing two-stroke exhaust pipes with expansion chambers, one or more within another, can be economically constructed, will deliver better fuel efficiency and provide more consistently delivered torque and power throughout the RPM range, while producing these benefits in a more confined area than previously possible.

A BRIEF DESCRIPTION OF THE DRAWINGS OF THE INVENTION

DESCRIPTION OF THE PREFERRED EMBODIMENTS OF THE INVENTION

Figure 1:
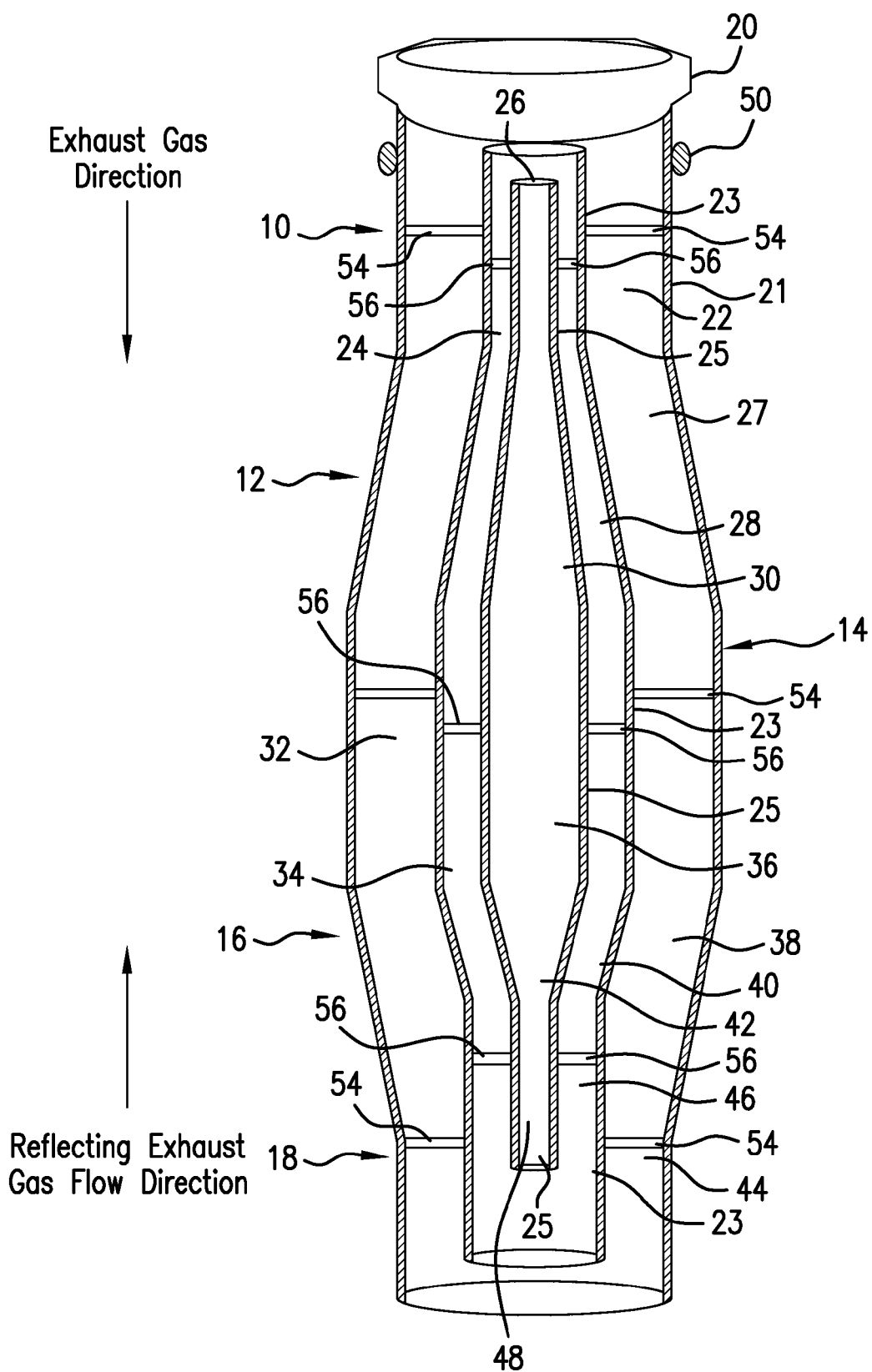
FIG. 1 shows a cross-sectional side view of an embodiment of the exhaust pipe of the present invention.

As previously stated, a main goal of a designer of exhaust systems for two-stroke internal combustion engines is to provide a design capable of reflecting certain beneficial pressure waves of exiting exhaust gases in a reverse direction, towards the engine's combustion chamber, where it will assist the entrapment of the next incoming quantity of the fresh mixture of fuel and air. As is known to those skilled in the art, this reverse pressure wave must arrive at an optimum time in the rotation cycle of the engine's crankshaft, as it relates to the rising piston and the piston's subsequent compression of the fresh charge of unburned air/fuel mixture. Such proper timing has been achieved in prior art designs through the use of an exhaust pipe incorporating a shape commonly known as the expansion chamber. The expansion chamber has multiple sections, and it greatly enhances the maximum torque and power output of earlier two-stroke engines which used a simple, straight-through exhaust pipe. Because the relationship of these sections is essentially fixed in terms of diameter and length, the timing of the exiting and returning pressure waves of exhaust gasses is also essentially fixed. The result is that at certain engine speeds, less-than-ideal timing of expanded and reflected exhaust gas flow occurs. During these periods, torque and power deficiencies are experienced, fuel efficiency declines, and air pollution increases. Moreover, because engines constantly run at differing RPMs, exhaust systems fabricated into a single primary shape containing an expansion chamber section utilize this section as a "tuning" device that provides for the interplay of expanded and reflected exhaust gas. Nevertheless, such systems were incapable of exploring the far limits of torque and power, nor could they increase efficiency enough to prevent excessive noxious exhaust gasses associated with most two-stroke engines, and they did not achieve a maximum usage of available space.

These problems have been overcome to a significant degree by the invention. Movements of pressure waves of exhaust gasses can be predicted and controlled, according to the design of the exhaust pipe's expansion chamber sections, regardless of the fact that said sections, being open on each end, accept and then later, expel exhaust gasses. Referring now to the drawings, the exhaust pipe of the invention is comprised of an exhaust pipe or tube that has an inlet section 10, an expansion section 12, a transition section 14, a reflector section 16, and an outlet section 18. The sections 10, 12, 14, 16 and 18 are joined together to provide for continuous flow of exhaust gases though the exhaust pipe. Typically, a collar 20 at the entrance to the inlet section 10 provides for attachment of the exhaust pipe to one or more exhaust ports of the two-stroke engine. The various sections of the exhaust pipe provide chambers that are defined by an outer tube 21, a tube 23 positioned inside of tube 21 and a tube 25 positioned inside of tube 23. These chambers are described hereinafter.

As best seen in the embodiment of FIG. 1, the tubes 23 and 25 extend through the inlet section 10, the expansion section 12, the transition section 14, the reflector section 16 and the outlet section 18. The inlet section 10 of the exhaust pipe is defined by the portions of the tubes 21, 23 and 25 that are of a substantially uniform diameter. The annular space between tubes 21 and 23 forms a primary inlet chamber 22. The annular space between tubes 23 and 25 forms a secondary inlet chamber 24, while the space inside tube 25 forms the tertiary chamber 26.

The chambers of the inlet section 10 are in direct communication with the expansion section 12, with the expansion section 12 being defined by the portions of the tubes 21, 23 and 25 where the diameters of the tubes gradually increase to a predetermined size. The space between outer tube 21 and tube 23 forms the primary expansion chamber 27. The space between tubes 23 and 25 forms a secondary expansion chamber 28, with a tertiary expansion chamber 30 formed inside tube 25.

Similarly, the portions of outer tube 21 and tubes 23 and 25 that form the transition section 14 are of a substantially uniform diameter, starting from the portions of the tubes that form the expansion section 12. The space between these portions of the outer tube 21 and tube 23 form the primary transition chamber 32. The space between tubes 23 and 25 forms a secondary transition chamber 34, with a tertiary transition chamber 36 formed inside tube 25. The transition chambers 32, 34 and 36 are in direct communication with expansion chambers 27, 28 and 30, respectively.

As shown in the drawings, the portions of outer tube 21 and tubes 23 and 25 that are designated the reflector section 16 gradually decrease in diameter from the end of the transition section 14. The space between the outer tube 21 and tube 23 forms the primary reflector chamber 38, with the secondary reflector chamber 40 formed between tubes 23 and 25. A tertiary reflector chamber 42 is formed inside tube 25. The transition chambers 32, 34 and 36 are in direct communication with reflector chambers 38, 40 and 42, respectively Finally, the diameter of each of the outer tube 21, tube 23 and tube 25 is of a substantially uniform dimension from the termination of the reflector section 16 through the exhaust section 18. This thus forms the primary exhaust chamber 44 between outer tube 21 and tube 23, and the secondary exhaust chamber 46 is formed between tubes 23 and 25, with the tertiary exhaust chamber 48 being contained inside tube 25.

It should be understood that the various chambers of each of the sections (inlet 10, expansion section 12, transition section 14, reflector section 16 and exhaust section 18) are connected so that the exhaust gases can flow freely from section to section. FIG. 1 indicates by arrows the flow of the exhaust gases from the engine and the reflective exhaust gases flowing in the opposite direction. Thus, the exhaust gas flow originating from running engines is permitted access to each, to any, or to all of the chambers of the primary, secondary, tertiary chambers of the invention, at any moment, according to the needs of engine designers and the needs of fabricators and tuners utilizing the invention's concepts. Gas flow directed toward each, toward any, or toward all chambers may be achieved with or without operating valves, vanes, diffusors, directives, or other means according to the needs of said engine designers, or of exhaust system fabricators and tuners.

Figure 2:
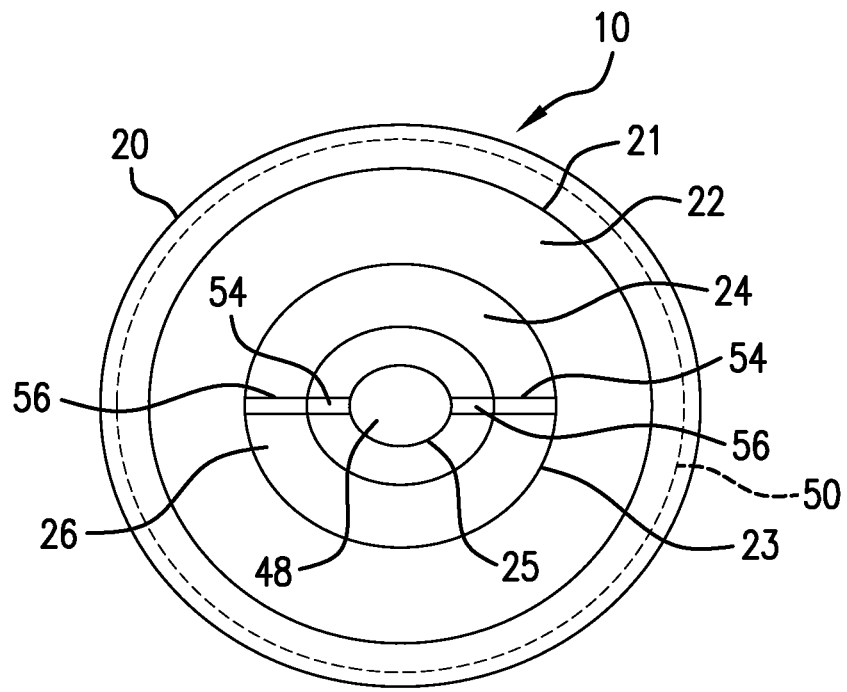
FIG. 2 is an end view of the inlet end of the exhaust pipe of FIG. 1
Figure 3:
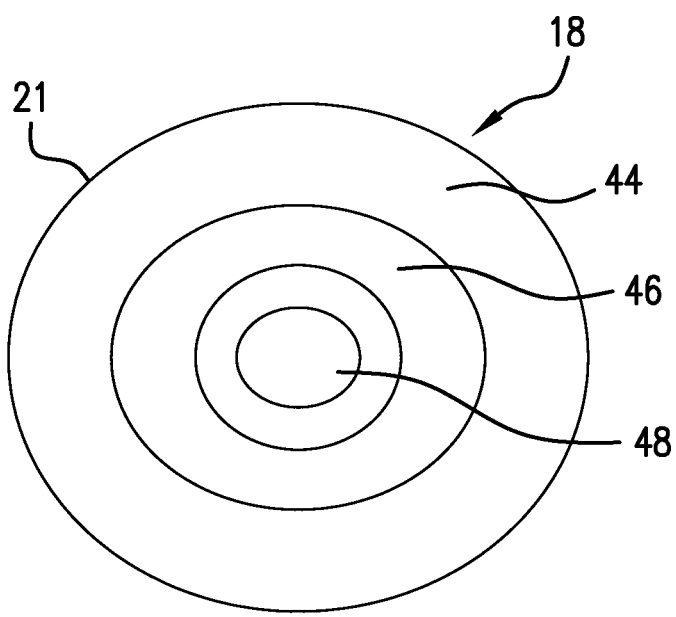
FIG. 3 is an end view of the outlet end of the exhaust pipe of FIG. 1.
Figure 4:
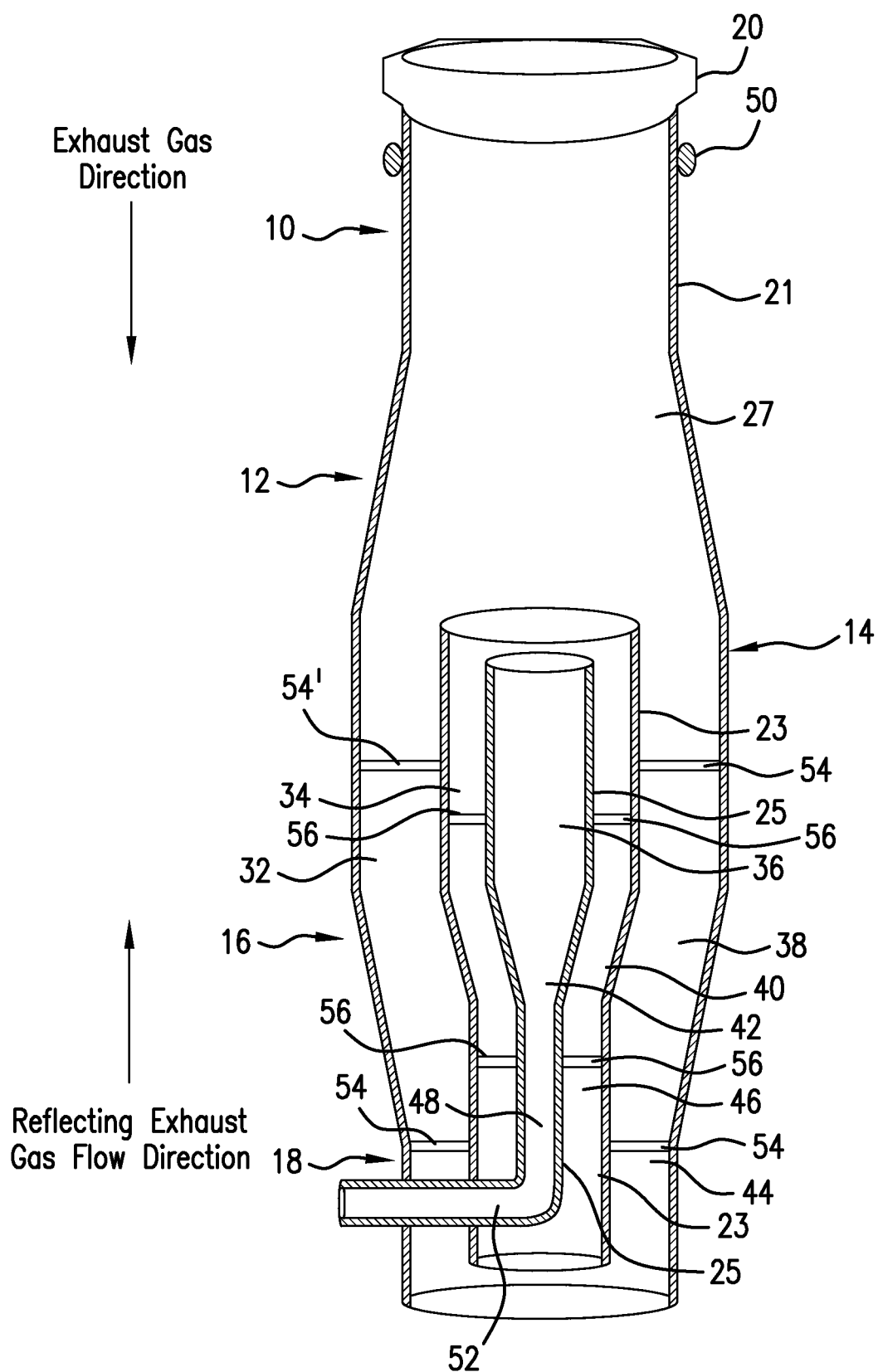
FIG. 4 is a cross-sectional side view of another embodiment of the invention.

Referring now to FIG. 4, there is illustrated another embodiment of the invention. This embodiment is substantially the same as the embodiment of FIGS. 1-3 except that the portions of the tubes 23 and 25 that form the inlet chambers 22 and 24 and the portions that form the expansion chambers 27 and 28 are eliminated. In other words, the inner tubes 23 and 25 commence within the transition section 14 and extend through at least a portion of the transition section 14, the reflector section 16, and the outlet section 18. Also, an additional option shown in this embodiment is an exhaust tube 52 that is in communication with the exhaust chambers 46 or 48 or both. As shown in FIG. 4, the tube 52 extends from the exhaust chamber 48 through the wall of tube 23 and the wall of tube 21. However, it could extend from the exhaust chamber 46, from chamber 46 and/or chamber 48 (or any other chambers in the exhaust pipe) through the walls of any of the tubes to the outside of the exhaust pipe. The exhaust tube 52 can also be similarly provided with the embodiment of FIG. 1. Exhaust tube 52 can terminate at the wall of tube 21 or it can extend beyond this wall as shown in FIG. 4. Engine performance does not seem to be affected by where tube 52 terminates as long as it exhausts to the atmosphere.

The embodiment of FIG. 4 provides the engine designer with more options of a design capable of reflecting certain beneficial pressure waves of exiting the exhaust gases in a reverse direction, towards the engine's combustion chamber, where it will assist the entrapment of the next incoming quantity of the fresh mixture of fuel and air. It is expected that depending upon the engine for which the exhaust system is designed, the embodiments of FIGS. 1 and 4 will be able to achieve the goal of delivering better fuel efficiency and more consistently delivered torque and power throughout the RPM range of the engine, while producing these benefits in a more confined area than previously possible.

It should be understood that although there are shown two tubes 23 and 25 within the outer tube 21, the principles of the invention are also applicable to a single tube within the outer tube 21, and in selected design situations, there could be more than the two tubes 23 and 25 within the outer tube 21. Also, in order to support tube 23 within tube 21 and support tube 25 within tube 23, suitable support members 54 and 56 may be welded or otherwise suitably affixed between the tubes at longitudinally spaced intervals as illustrated in FIGS. 1 and 4.

The invention thus places expansion chambers of multiple dimensions within one another as a successful means of providing reflected exhaust gas "tuning". There has been disclosed multiple chambers—primary, secondary and tertiary—within each of the sections. It should be understood that additional chambers can be created by including additional pipes within the three described pipes. With the invention, it is possible to produce exhaust pressure waves at desired, prescribed moments throughout the RPM range of an engine, according to the engine designer's needs. Tests have shown that placing a secondary, or secondary and tertiary, or secondary, tertiary, or additional systems, each having expansion chambers of specific dimensions and all existing within one another, improves the torque, power and efficiency of two-stroke engines. Such additional systems of chambers may be suspended from one another, or connected to one another directly or by any suitable means, including common walls while all exist within a larger primary expansion chamber of specific dimensions.

Additionally, placing exhaust pipe systems of different dimensions within one another allows for economical use of available space when compared to other concepts, which use differently sized multiple chambers standing independent of one another, except for the location where they must join together to receive the initial exhaust wave exiting the exhaust port of a cylinder.

As is known by persons skilled in the art, exhaust pipes utilizing the expansion chamber system may be of different cross-sectional shapes other than circular and may be configured not only in straight lines, but may be comprised of curved, bent, or otherwise non-linear shapes and sizes. This feature of two-stroke engine exhaust systems allows their use in locations burdened with obstructions. Such a requirement does not present significant challenges to the system of the invention, for the reason that all portions of the system of the invention may be configured in infinite shapes and dimensions. Fixed brackets, welded connectors, abutments, plates, or mechanical attachments may be used to secure a chamber residing within another chamber. The exterior may also have devices such as hooks, eyelets, brackets, connectors, such as loops 50 affixed, so that the entire exhaust system can be adequately secured to an engine or vehicle. It will be understood by those skilled in the art, that the principles of the invention are also applicable to, and will accommodate, designs where one or more portions of the exhaust pipe are linearly moveable for fine-tuning of torque and power at various RPMs.

Additionally, for purposes of noise reduction and safety from excessive heat, the invention may be housed within a container of the constructor's choice without significantly reducing efficiency. In addition, a simple flange or plate (not shown) may be affixed toward the discharge end of the system to provide a fixing point for silencing devices such as mufflers, diffusers, or arrestors.

Finally, it should be pointed out that the exhaust pipe consisting of one system within another may be used for more than one piston of an engine. By use of a "Y" or "W" or similar manifold connector pipe, one complete exhaust system may serve more than one cylinder, piston, combustion chamber, and exhaust port. With use of a "Y" or "W" or similar manifold device, a single complete system may serve any number of cylinders, pistons, combustion chambers and exhaust ports in which the rotation of the crankshaft brings more than one piston to top dead center at essentially the same moment.

As evident from the above description, the invention has: (a) raised the level of torque and power and efficiency produced by a two-stroke engine by placing secondary or more exhaust pipes containing secondary or more "expansion chamber" portions of those pipes, one within one another; (b) provided these benefits throughout the RPM range of the engine; and (c) achieved these goals in a compact unit.

In summary, the known somewhat effective exhaust systems serving two-stroke engines are fabricated as a single exhaust pipe with a single expansion chamber configured into its formation, capable of serving one or more cylinders. Other systems exist which utilize multi-chambered configurations, essentially nesting side-by-side or bundled expansion chambers. Such designs join these chambers for acceptance, expansion, transfer, reflection and exit of the primary exhaust wave resulting from the explosion of fuel as it exits the exhaust port of a cylinder. In some systems, individual expansion chambers share common walls and are literally joined together; others remain independent of one another. These configurations are attempts to provide for the optimally-timed arrival of reflected exhaust gasses by way of multiple expansion chambers, however, they result in the need for more available space than is required by the invention. Automobile manufacturers, snowmobile manufacturers and motorcycle manufacturers have long sought a compact and torque and power-producing system, such as that which the invention provides.

Having thus provided a disclosure in connection with the preferred embodiments thereof, it will be evident to those skilled in the art that various revisions can be made to the preferred embodiments described herein without departing from the spirit and scope of this disclosure. It is my intention, however, that all such revisions and modifications that are evident to those skilled in the art will be included within the scope of the following claims.

The invention claimed is:

1. An exhaust system for a two-stroke internal combustion engine having one or more exhausts ports, said exhaust system comprising:
   a hollow outer tube having an inlet end adapted to be connected to one or more exhaust ports of the internal combustion engine and an outlet end for conducting the exhaust gases to the atmosphere;
   the outer tube having an inlet section, an expansion section, a transition section, a reflector section and an outlet section joined together in sequence and providing for continuous flow of the exhaust through the sections;
   the inlet section of the outer tube being of uniform diameter along its length, the expansion section gradually increasing in diameter along its length until its joinder with the transition section, the transition section being of a uniform diameter along its length, the reflector section gradually decreasing in diameter along its length from the transition section until its joinder with the outlet section, the outlet section being of uniform diameter along its length; and
   a first hollow inner tube positioned fully inside the outer tube and having an open inlet end and an open outlet end, the first hollow inner tube forming annular chambers with the outer tube through at least one of the transition, reflector and outlet sections of the outer tube so that the radial distance between the inner tube and outer tube at any given point along the length of at least one of the transition, reflector and outlet sections of the outer tube remains the same, whereby the exhaust gases can flow though the chambers.

2. The exhaust system of claim 1 in which a second hollow inner tube is positioned fully inside the first inner tube, the second inner tube having an open inlet end and an open outlet end and forming annular chambers with the first inner tube through at least the transition, reflector and outlet sections of the first inner tube.

3. The exhaust system of claim 2 in which the second inner tube is configured with sections comparable to the sections of the first inner tube so as to form annular chambers between the sections of the second inner tube and the first inner tube which chambers are uniform in size along their lengths.

4. The exhaust system of claim 2 in which an exhaust tube is combined with the outlet end of the first inner tube to conduct the exhaust gases in the first inner tube directly to the atmosphere.

5. The exhaust system of claim 1 in which the first inner tube forms annular chambers with the outer tube through all of the inlet section, the expansion section, the transition section, the reflector section and the outlet section.

6. The exhaust system of claim 5 in which the first hollow inner tube is configured with sections comparable to the sections of the outer tube so as to form annular chambers between the sections of the outer tube and the first inner tube which chambers are uniform in size along their lengths.

7. The exhaust system of claim 5 in which a second hollow inner tube is positioned fully inside the first inner tube, the second inner tube having an open' inlet end and an open outlet end and forming annular chambers with the first inner tube through the inlet section, the expansion section, the transition section, the reflector section, and the outlet section of the first inner tube.

* * * * *